United States Patent
Webster

(10) Patent No.: US 11,007,526 B2
(45) Date of Patent: May 18, 2021

(54) CAPLESS SAMPLE WELL PORT FOR A CARTRIDGE

(71) Applicant: QORVO US, INC., Greensboro, NC (US)

(72) Inventor: James Russell Webster, Minnetonka, MN (US)

(73) Assignee: Qorvo US, Inc., Greensboro, NC (US)

( * ) Notice: Subject to any disclaimer, the term of this patent is extended or adjusted under 35 U.S.C. 154(b) by 167 days.

(21) Appl. No.: 16/146,108

(22) Filed: Sep. 28, 2018

(65) Prior Publication Data
US 2020/0009559 A1    Jan. 9, 2020

Related U.S. Application Data

(60) Provisional application No. 62/694,508, filed on Jul. 6, 2018.

(51) Int. Cl.
| | | |
|---|---|---|
| *G01N 35/02* | (2006.01) | |
| *B01L 3/00* | (2006.01) | |
| *G01N 35/10* | (2006.01) | |

(52) U.S. Cl.
CPC ... *B01L 3/502746* (2013.01); *B01L 3/502707* (2013.01); *B01L 3/502723* (2013.01); *B01L 3/502738* (2013.01); *G01N 35/1095* (2013.01); *B01L 2300/0809* (2013.01); *B01L 2300/14* (2013.01); *B01L 2400/0406* (2013.01); *B01L 2400/0487* (2013.01)

(58) Field of Classification Search
CPC .... G01N 35/1095; G01N 35/02; G01N 35/00; B01L 3/502746; B01L 3/5027; B01L 3/502; B01L 3/50

USPC .............................. 436/43; 422/503, 500, 50
See application file for complete search history.

(56) References Cited

U.S. PATENT DOCUMENTS

| | | | |
|---|---|---|---|
| 2003/0037611 A1* | 2/2003 | Purpura ............... | G01N 35/026 73/290 R |
| 2007/0245810 A1* | 10/2007 | Carter .................. | C07D 207/46 73/53.01 |
| 2015/0132860 A1* | 5/2015 | Cook .................... | F04B 49/106 436/501 |
| 2016/0091506 A1* | 3/2016 | Webster ............... | G01N 29/036 435/5 |

OTHER PUBLICATIONS

Merriam-Webster, Definition of Port, obtained on Dec. 15, 2020 from https://www.merriam-webster.com/dictionary/port, pp. 1-13. (Year: 2020).*

* cited by examiner

*Primary Examiner* — Christine T Mui
(74) *Attorney, Agent, or Firm* — Mueting Raasch Group

(57) ABSTRACT

A cartridge for collecting sample material may include a cartridge body, a filter, a fluid reservoir, and a fluid drive port. The cartridge body may define a capless sample well port configured to receive a sample material and a fluidic channel in fluid communication with the capless sample well port. The filter may be positioned between the capless sample well port and the fluidic channel. The fluidic channel may extend between the capless sample well port and the fluid reservoir. The fluid drive port may be in fluid communication with the fluidic channel. The fluid drive port may be configured to be operably connected to a pressure source such that a pressure is applied within the fluidic channel to direct the sample material towards the fluid reservoir.

18 Claims, 6 Drawing Sheets

CAPLESS SAMPLE WELL PORT FOR A CARTRIDGE

RELATED APPLICATIONS

This application claims priority to U.S. Provisional Application Ser. No. 62/694,508, filed on 6 Jul. 2018, the contents of which are incorporated herein in its entirety.

TECHNICAL FIELD

Embodiments of the present disclosure relate generally to bulk acoustic wave (BAW) resonators and their use as biosensors. In particular, the present disclosure relates to cartridges that are configured to receive a sample material and the sample material is contained within the cartridge without capping the sample port.

BACKGROUND

Numerous instruments and measurement techniques exist for diagnostic testing of materials for medical, veterinary medical, environmental, biohazard, bioterrorism, agricultural, and food safety purposes. Diagnostic testing traditionally requires long response times to obtain meaningful data, involves expensive, remote, or cumbersome laboratory equipment, requires large sample size, utilizes multiple reagents, demands highly trained users, and can involve significant direct and indirect costs. For example, in both the human and veterinary diagnostic markets, most tests require that a sample be collected from a patient and then be sent to a laboratory, where the results are not available for several hours or days. As a result, the caregiver must wait to treat the patient.

Point of use (or point of care when discussing human or veterinary medicine) solutions for diagnostic testing and analysis, although capable of solving most of the noted drawbacks, remain somewhat limited. Even some of the point of use solutions that are available, are limited in sensitivity and reproducibility compared to in-laboratory testing. There are also often significant costs involved as separate systems may be needed for different point of use tests.

Further, fluidic devices or cartridges may be configured to receive a sample material and the sample material may be drawn in by capillary force through channels defined by the fluid devices or cartridges. Once the sample material is within the channels, positive or negative pressure may be used to move the sample material within the channels. Typically, the sample port through which the sample material is disposed into the cartridge must be closed (e.g., by capping the sample port). As such, the cap prevents sample material from exiting back through the sample port when pressure is applied to move the sample material within the channels. However, in some instances, attaching the cap to the sample port may apply a pressure within the channels of the cartridge, which may apply an undesired force upon the sample material. Additionally, a cap attached to the sample port may not be reliable because, e.g., the cap is an additional loose component, the cap may become damaged, etc.

It would be desirable to provide a cartridge that does not require a cap attached to the sample port after sample material is received within the cartridge.

SUMMARY

Embodiments described herein may provide a cartridge including a capless sample well port. In other words, the sample well port that is configured to receive a sample material does not include a cap (e.g., a component configured to seal or cover the sample well port) positioned on or attached to the sample well port (e.g., before, during, and/or after depositing the sample material into the sample well port). The cartridge may include a filter located proximate the sample well port such that sample material may pass through the filter and into a fluidic channel defined by the cartridge. Furthermore, when a pressure (e.g., a pneumatic pressure) is applied to the sample material (e.g., to move the sample material through the fluidic channel to a fluid reservoir), the gas used to apply the pressure is prevented from passing through the wetted filter such that the gas may only apply pressure to the sample material. In other words, the filter may effectively restrict gases (e.g., by preventing the flow of gas through the filter), but may allow the free flow (e.g., in either direction through the filter) of fluid through the filter.

An illustrative cartridge may include a cartridge body, a filter, a fluid reservoir, and a fluid drive port. The cartridge body may define a capless sample well port configured to receive a sample material and a fluidic channel in fluid communication with the capless sample well port. The filter may be positioned between the capless sample well port and the fluidic channel. The fluidic channel may extend between the capless sample well port and the fluid reservoir. The fluid drive port may be in fluid communication with the fluidic channel. The fluid drive port may be configured to be operably connected to a pressure source such that a pressure is applied within the fluidic channel to direct the sample material towards the fluid reservoir.

In one or more embodiments, the filter may define a bubble point of less than or equal to 4,000 Pa. In one or more embodiments, the fluidic channel may be configured to provide a capillary action on the sample material passing through the fluidic channel. In one or more embodiments, the capless sample well port may be located between the fluid drive port and the fluid reservoir. In one or more embodiments, the fluidic channel further may include an overflow fluidic channel portion. The overflow fluidic channel portion may be located upstream of a reservoir port of the fluid reservoir. In one or more embodiments, the fluid drive port may be configured to be operably connected to a pump. In one or more embodiments, the fluidic channel may include a capillary stop proximate the fluid reservoir. The capillary stop may be configured to allow the sample material to pass therethrough at a pressure greater than or equal to 500 Pa. In one or more embodiments, the pressure may be applied upstream of the fluid reservoir. In one or more embodiments, the cartridge may also include a sensor, which may include a bulk acoustic resonator having a sensing surface, and a fluid flow path extending between the fluid reservoir and the sensing surface.

An illustrative system may include an instrument for testing a sample material and may define a receptacle. The instrument may include the pressure source. The system may also include the illustrative cartridge, as described herein. The cartridge may be configured to be inserted into the receptacle of the instrument. In one or more embodiments, the pressure source of the instrument may be configured to be in fluid communication with the fluid drive port of the cartridge when the cartridge is inserted into the instrument.

An illustrative method of collecting a sample material may include adding the sample material to a cartridge through a capless sample well port defined by a cartridge body of the cartridge. The method may also include wicking the sample material through a filter positioned between the capless sample well port and a fluidic channel defined by the cartridge body. Further, the method may include collecting the sample material in the fluidic channel and applying a pressure through a fluid drive port of the cartridge in fluid communication with the fluidic channel. Further yet, the method may include directing the sample material into a fluid reservoir by applying the pressure through the fluid drive port.

In one or more embodiments, the pressure applied through the fluid drive port may greater than or equal to 500 Pa (e.g., greater than a capillary stop pressure threshold) and less than or equal to 4,000 Pa (e.g., less than a filter bubble point pressure). In one or more embodiments, applying a pressure through a fluid drive port of the cartridge in fluid communication with the fluidic channel may include applying a positive pressure through the fluid drive port via a pump operably connected to the fluid drive port. In one or more embodiments, the method may also include containing the sample material within the fluidic channel due to a capillary stop of the fluidic channel proximate the fluid reservoir. In one or more embodiments, directing the sample material into a fluid reservoir by applying the pressure through the fluid drive port may include overcoming the capillary stop of the fluidic channel.

In one or more embodiments, the method may also include inserting the cartridge into an instrument to operably couple the fluid drive port to a pressure source. In one or more embodiments, the filter may include a bubble point of less than or equal to 4,000 Pa. In one or more embodiments, collecting the sample material in the fluidic channel may include wicking the sample material into the fluidic channel via capillary action. In one or more embodiments, applying a pressure through a fluid drive port of the cartridge in fluid communication with the fluidic channel may include applying a positive pressure upstream of the fluid reservoir.

The above summary is not intended to describe each embodiment or every implementation. Rather, a more complete understanding of illustrative embodiments will become apparent and appreciated by reference to the following Detailed Description of Selected Embodiments and Claims in view of the accompanying figures of the drawing.

BRIEF DESCRIPTION OF THE VIEWS OF THE DRAWING

Exemplary embodiments will be further described with reference to the figures of the drawing, wherein.

Figure 1:
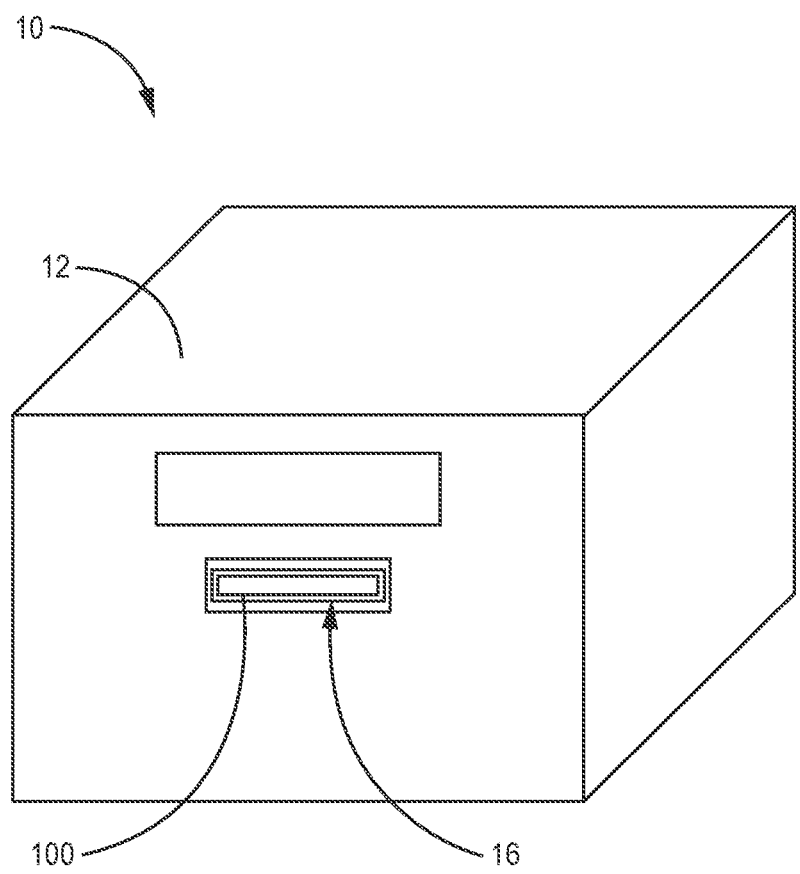
FIG. 1 illustrates a schematic perspective view of a system according to an embodiment.

The figures are rendered primarily for clarity and, as a result, are not necessarily drawn to scale. Moreover, various structure/components may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF SELECTED EMBODIMENTS

In the following detailed description, several specific embodiments of devices, systems and methods are disclosed. It is to be understood that other embodiments are contemplated and may be made without departing from the scope or spirit of the present disclosure. Reference is made to the accompanying figures of the drawing which form a part hereof. It is to be understood that other embodiments, which may not be described and/or illustrated herein, are certainly contemplated. The following detailed description, therefore, is not to be taken in a limiting sense.

The present disclosure relates to bulk acoustic wave (BAW) resonators and their use as biosensors. In particular, the present disclosure relates to devices, such as cartridges, containing bulk acoustic wave resonators and may be used without capping a sample well port through which a sample material is introduced to the cartridge.

As shown schematically in FIG. 1, a cartridge 100 may be used as part of a system 10 with an instrument or reader 12 constructed to receive the cartridge 100. For example, the instrument 12 may define a receptacle 16 configured to receive the cartridge 100 (e.g., the cartridge 100 may be configured to be inserted into the receptacle 16 of the instrument 12). Additionally, the cartridge 100 may be configured to lock or secure into position within the receptacle 16 of the instrument 12. In other words, the cartridge 100 may be configured such that the cartridge 100 cannot fall or slip out of the receptacle 16 after the cartridge 100 has been received by the receptacle 16. In some embodiments, the cartridge 100 and the receptacle 16 may be sized such that there is an interference fit between the cartridge 100 and the receptacle 16 (e.g., friction may help maintain the cartridge 100 attached within the receptacle 16). In other embodiments, the cartridge 100 and the receptacle 16 may include a locking apparatus to maintain a robust connection between the cartridge 100 and the receptacle 16 when the cartridge 100 is received by the receptacle 16. For example, cartridge 100 and the receptacle 16 may interact through a snap hook mechanism, a luer lock, threads, a bayonet mount, a clip, or any other suitable fastener. In one or more embodiments, the instrument 12 may include an active lock (e.g., a motor with linear drive and an electromagnetic brake) to move the cartridge 100 in to and out of the receptacle 16, and also may help to secure the cartridge 100 within the receptacle 16.

The instrument 12 may provide solutions used in sample handling in the cartridge 100, and may be used to read and optionally interpret the results from the BAW sensor in the cartridge 100. The cartridge 100 of the present disclosure embodies the integrated components necessary to convert a BAW resonator, or array of BAW resonators, into a biosensor. This allows for a collection of the tools integrated into a single cartridge that can be tailored for the detection of one or more analytes, such as proteins, DNA, bacteria, fungi, viruses, and other biological or non-biological materials.

The disclosed cartridges can accommodate a large breadth of testing protocols without requiring the platform to be entirely redesigned. The disclosed cartridges may also provide for the use of the same configuration for different protocols, meaning that only the materials would need to be different to afford different protocols to be undertaken with the device. The cartridges may be manufactured with a selectable or interchangeable sensor platform that allows for even more flexibility. For example, the cartridge may include a cartridge body and a carousel. The cartridges or parts of the cartridges may be reusable, recyclable, or disposable. The cartridges may be offered as "dry" cartridges (e.g., within the cartridge body and, e.g., including a sensor), meaning that no liquid reagents are stored on the device, making the cartridges simpler and more cost-effective to manufacture, and improving storage life of the device. In one or more embodiments, the carousel of the cartridge may contain sealed liquid reagents. However, in other embodiments, the carousel of the cartridge may contain dry reagents. The cartridges are portable and can be used at the sampling location or transported into a laboratory or other secondary site for analysis.

The cartridges of the present disclosure are constructed to receive a liquid sample (e.g., through a sample well port defined by the cartridge body), to at least temporarily store the sample, to provide sample handling and conditioning, and to transfer and meter the sample to a sensor for analysis of one or more parameters of the sample. Examples of typical samples include biological samples, such as urine, plasma, serum, blood, saliva, tears, sweat, and the like, and environmental samples, such as water and aqueous solutions. However, the device can be modified to accommodate various types of fluid samples, and is not particularly limited by sample type.

The cartridges of the present disclosure utilize sensors with bulk acoustic wave (BAW) resonators. According to an embodiment, the cartridge contains a BAW resonator in a fluid flow path. BAW resonators generally include a piezoelectric crystal resonator that can be used to detect changes in material (e.g., changes in the mass of the material) deposited (e.g., bound) on the surface of the resonator or changes in fluid properties (such as viscosity) of a sample. The BAW resonator may have biomolecules, such as antibodies or other proteins such as receptors, or the like, attached to its surface such that when the target analyte passes over the surface, it binds onto the biomolecule. Binding of the analyte the biomolecule attached to the surface of the sensor may increase the mass bound to the sensor, which may alter the wave propagation characteristics (e.g., magnitude, frequency, phase, etc.) of the sensor. The change in propagation characteristics due to analyte binding may be correlated with the amount of bound analyte and, thus, the amount of analyte in the sample. The cartridge may be prepared with various select biomolecules based on the desired target analyte or analytes.

BAW devices typically involve transduction of an acoustic wave using electrodes arranged on opposing top and bottom surfaces of a piezoelectric material. In a BAW device, three wave modes may propagate, namely, one longitudinal mode (embodying longitudinal waves, also called compressional/extensional waves), and two shear modes (embodying shear waves, also called transverse waves), with longitudinal and shear modes respectively identifying vibrations where particle motion is parallel to or perpendicular to the direction of wave propagation. The longitudinal mode is characterized by compression and elongation in the direction of the propagation, whereas the shear modes consist of motion perpendicular to the direction of propagation with no local change of volume. Longitudinal and shear modes propagate at different velocities. In practice, these modes are not necessarily pure modes as the particle vibration, or polarization, is neither purely parallel nor purely perpendicular to the propagation direction. The propagation characteristics of the respective modes depend on the material properties and propagation direction respective to the crystal axis orientations. The ability to create shear displacements is beneficial for operation of acoustic wave devices with fluids (e.g., liquids) because shear waves do not impart significant energy into fluids. BAW devices include bulk acoustic resonators deposited on one or more reflective layers, such as Bragg mirror, and film bulk acoustic resonators having an air-gap.

The BAW sensor described herein may employ any suitable piezoelectric thin film. Certain piezoelectric thin films are capable of exciting both longitudinal and shear mode resonance, such as hexagonal crystal structure piezoelectric materials including (but not limited to) aluminum nitride (AlN) and zinc oxide (ZnO). To excite a wave including a shear mode using a piezoelectric material layer arranged between electrodes, a polarization axis in a piezoelectric thin film is generally non-perpendicular to (e.g., tilted relative to) the film plane. In sensing applications involving liquid media, the shear component of the resonator is preferably used. In such applications, piezoelectric material may be grown with a c-axis orientation distribution that is non-perpendicular relative to a face of an underlying substrate to enable a BAW resonator structure to exhibit a dominant shear response upon application of an alternating current signal across electrodes thereof. Conversely, a piezoelectric material grown with a c-axis orientation that is perpendicular relative to a face of an underlying substrate will exhibit a dominant longitudinal response upon application of an alternating current signal across electrodes thereof.

Figure 2:
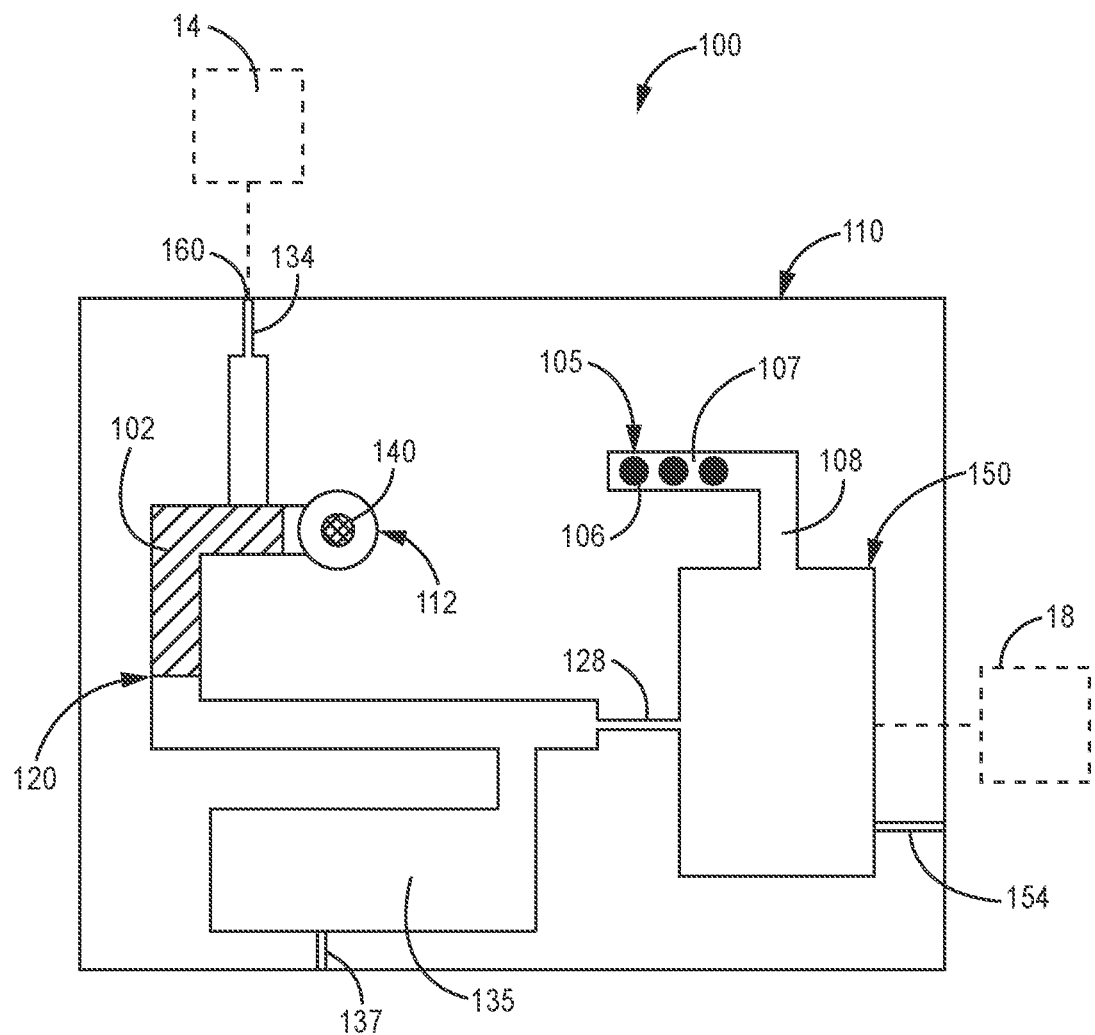
FIG. 2 illustrates a schematic top view of an embodiment of a cartridge in accordance with embodiments of the present disclosure.

An illustrative cartridge 100 including a cartridge body 110 is depicted in FIG. 2. The cartridge body 110 may include a sample well port 112 configured to receive a sample material 102. The sample well port 112 may be any suitable shape and size to assist in directing a sample material 102 into the cartridge 100. The sample well port 112 may be described as a capless sample well port because, e.g., the sample well port 112 may not require or need a cap covering the sample well port 112. A cap may be described herein as a solid material through which gas and/or fluid may not pass. Specifically, the sample well port 112 may remain uncovered or open at all times (e.g., the sample well port 112 may not be sealed closed). In some embodiments, the sample well port 112 or portions of the cartridge body 110 surrounding the sample well port 112 may be configured such that a cap cannot be attached thereto. In other embodiments, the sample well port 112 or portions of the cartridge body 110 surrounding the sample well port 112 may be configured to receive a cap, but a cap is not attached thereto (e.g., before, during, and/or after sample material is disposed within the sample well port 112).

However, in some embodiments, a cap may initially cover the sample well port 112 (e.g., upon delivery of the cartridge 100 to an end-user, prior to depositing the sample material 102 into the sample well port 112, etc.), but the cap may be removed prior to depositing the sample material 102 into the sample well port 112 and no cap (e.g., the initial cap or any other cap) may cover the sample well port 112 thereafter. Further, it may be described that the cartridge 100 may not include a cap covering the sample well port 112 when the cartridge 100 is received by the instrument 12 or during testing of the sample material 102 (e.g., when the cartridge 100 is received by the instrument 12). Further yet, it may be described that the cartridge 100 may not include a cap covering the sample well port 112 after the sample material 102 is received by the sample well port 112 and before the sample material 102 is tested (e.g., when the cartridge 100 is received by the instrument 12).

The sample material 102 may be deposited into the cartridge 100 through the sample well port 112 in any suitable way. For example, the sample material 102 may be added to the cartridge 100 through the sample well port 112 using a disposable dropper, an adjustable pipette, a fixed volume pipette, a dual-bulb metering dropper, a blood tube transfer device, syringe, a capillary tube, a pipet tube, a plastic spike and vacuum blood collection tube, etc.

The cartridge body 110 may also define a fluidic channel 120 (e.g., microfluidics) in fluid communication with the sample well port 112 and configured to provide a passage for the sample material 102 within the cartridge body 110. For example, sample material 102 that is deposited within the sample well port 112 may disperse into the fluidic channel 120. The fluidic channel 120 may be any suitable passageway through which a fluid (e.g., the sample material 102) may travel. The fluidic channel 120 may be configured to provide a capillary action on the sample material 102 passing through the fluidic channel 120. In other words, the fluidic channel 120 may draw sample material 102 into the cartridge 100 through capillary action of the fluidic channel 120, e.g., without the use of an auxiliary device to force sample material through the sample well port 112.

The fluidic channel 120 may exhibit the capillary action due to one or both of a hydrophilic material or coating of the fluidic channel 120 and the dimensions of the fluidic channel 120. For example, in one or more embodiments, at least one surface of the fluidic channel 120 may be made from or coated with hydrophilic material to optimize or control the ability for fluids to flow through the fluidic channel 120. As such, the at least one surface of the fluidic channel 120 may attract (e.g., through a wicking effect or capillary action) fluid (e.g., the sample material 102) such that the fluid travels along the fluidic channel 120. Further, the fluidic channel 120 may be dimensioned such that fluid (e.g., the sample material 102) may be contained by the fluidic channel 120 (e.g., due to surface tension forces) as well as flow along the fluidic channel 120.

Further, the cartridge 100 may include a fluid reservoir 150 (e.g., a sample well) configured to collect sample material 102 to be tested. In one or more embodiments, the fluid reservoir 150 may defined by a carousel (e.g., which may be detachable from the cartridge body 110, which may rotate relative thereto, etc.). The fluidic channel 120 may extend between the sample well port 112 and the fluid reservoir 150. The fluid reservoir 150 may define a total volume of any suitable size. Specifically, the fluid reservoir 150 may define a total volume of less than or equal to 1 mL, 500 uL, 100 uL, 50 uL, 10 uL, etc. A pressure may be applied within the fluidic channel 120 (e.g., a pneumatic or hydraulic pressure) to force the sample material 102 out of the fluidic channel 120 and into the fluid reservoir 150. Additionally, in one or more embodiments, the fluid reservoir 150 may include a reservoir vent 154 configured to relieve any pressure from within the fluid reservoir 150. For example, the reservoir vent 154 may include a hydrophobic material such that a liquid (e.g., the sample material 102) may be prevented from passing through the reservoir vent 154 and, e.g., out of the fluid reservoir 150. In such embodiments in which the fluid reservoir 150 is defined by a carousel, wells defined within the carousel may be open (e.g., to allow for venting).

Also, the cartridge 100 may include an overflow fluidic channel 135 (e.g. an overflow reservoir) in fluid communication with the fluidic channel 120 between the fluid reservoir 150 and the sample well port 112. The overflow fluidic channel 135 may assist in collecting extraneous sample material 102 after the fluidic channel 120 is "filled" with sample material 102. In one or more embodiments, the overflow fluidic channel 135 may include an overflow vent 137 (e.g., including a hydrophobic membrane inline) that allows air or gases, but not fluids, to escape the overflow fluidic channel 135 in order to, e.g., equalize pressure within the overflow fluidic channel 135. The overflow vent 137 may include a hydrophobic membrane to prevent fluid from passing through the overflow vent 137. Additionally, in one or more embodiment, the overflow vent 137 may act as a capillary stop (e.g., connected through overflow port 139 illustrated in FIG. 4) to prevent fluid from passing out of the overflow fluidic channel 135. Therefore, the overflow fluidic channel 135 may not fill past the overflow port 139. When in operation, the overflow port 139 may be closed such that air passing through the fluidic channel 120 pushes sample material 102 into the fluid reservoir 150 and not through the overflow port 139 (e.g., by inserting the cartridge 100 within the receptacle 16, the instrument 12 may be configured to close the overflow port 139).

Further yet, the cartridge 100 may include a fluid drive port 160 in fluid communication with the fluidic channel 120. The fluid drive port 160 may be configured to be operably connected to a pressure source 14 (e.g., a displacement pump) such that a pressure may be applied within the fluidic channel 120 to direct the sample material 102 towards and into the fluid reservoir 150. In FIG. 2, the pressure source 14 is illustrated in broken lines because the pressure source 14 may be positioned within the instrument 12 such that the pressure source 14 may only be operably connected with the cartridge 100 when the cartridge 100 is inserted into the instrument 12.

In one or more embodiments, the sample well port 112 may be located between the fluid drive port 160 and the fluid reservoir 150. In other words, the fluid drive port 160 may be positioned upstream (e.g., according to the direction of applied pressure from the fluid drive port 160 to the fluid reservoir 150) of the sample well port 112. Further, in one or more embodiments, the sample well port 112 may be located closer to the fluid drive port 160 than the fluid reservoir 150. The location of the sample well port 112 closer to the fluid drive port 160 may minimize the amount of sample material 102 that may go untested because, e.g., the sample material 102 from the fluidic channel 120 may be forced to fluid reservoir 150 and the sample material 102 located between the sample well port 112 and the fluid drive port 160 may not.

In one or more embodiments, the fluidic channel 120 may include a first capillary stop 134 located proximate the fluid drive port 160 (e.g., between the remainder of the fluidic channel 120 and the fluid drive port 160) and a second capillary stop 128 located proximate the fluid reservoir 150 (e.g., between the remainder of the fluidic channel 120 and the fluid reservoir 150). The first and second capillary stops 134, 128 may be configured to prevent the sample material 102 from passing through the capillary stops 134, 128 without a predetermined pressure applied (e.g., due to surface tension forces). For example, the first and second capillary stops 134, 128 may be configured to allow the sample material to pass therethrough at a pressure greater than or equal to 400 Pa, greater than or equal to 500 Pa, greater than or equal to 600 Pa, etc. As a result, the sample material 102 may be prevented from entering the fluid drive port 160 or the fluid reservoir 150 (e.g., only remaining within the fluidic channel 120) when a pressure is not applied within the fluidic channel 120 (e.g., because of the first and second capillary stops 134, 128).

The first and second capillary stops 134, 128 may define the pressure at which fluid may pass through the capillary stop due to the dimensions of each of the first and second capillary stops 134, 128. For example, each of the first and second capillary stops 134, 128 may define a channel having a width of about greater than or equal to 50 um, greater than or equal to 100 um, greater than or equal to 200 um, greater than or equal to 300 um, etc. and/or less than or equal to 600 um, less than or equal to 500 um, less than or equal to 400 um, less than or equal to 250 um, etc. Also, for example, each of the first and second capillary stops 134, 128 may define a depth of about greater than or equal to 50 um, greater than or equal to 100 um, greater than or equal to 200 um, greater than or equal to 300 um, etc. and/or less than or equal to 600 um, less than or equal to 500 um, less than or equal to 400 um, less than or equal to 250 um, etc. Further, a length of the first and second capillary stops 134, 128 may have no bearing on the pressure of the stop (e.g., to establish a fluid pressure needed to pass through the capillary stop). In one or more embodiments, the capillary stops may define a hole (e.g., defining a diameter of about 400 um) between channels/reservoirs of the cartridge to create a capillary stop therebetween.

Upon use of the cartridge 100, a user may add sample material 102 through the sample well port 112 until the sample material fills the fluidic channel 120 and reaches the second capillary stop 128. Therefore, the volume of the sample material 102 delivered from the fluidic channel 120 to the fluid reservoir 150 may be controlled or defined by the volume of the fluidic channel 120 between the first and second capillary stops 134, 128. In other words, because the sample material may be prevented from entering the first and second capillary stops 134, 128 without an applied pressure (e.g., greater than or equal to 500 Pa), the amount of sample material 102 is limited by the volume defined by the fluidic channel 120. After the fluidic channel 120 is filled with sample material 102, if the user attempts to add additional sample material 102, the additional sample material 102 may remain in the sample well port 112 (if, e.g., the cartridge 100 does not include an overflow fluidic channel or reservoir) because the pressure applied simply from adding sample material 102 to the sample well port 112 does not exceed the pressure barrier of the first or second capillary stops 134, 128 (e.g., does not exceed 500 Pa).

In one or more embodiments, the fluidic channel 120 of the cartridge 100 may include a fill line. The fill line may provide visual feedback to the user as to the proper and adequate fluid delivery within the fluidic channel 120. For example, the fill line may be positioned proximate the capillary stop 128 between the fluidic channel 120 and the fluid reservoir 150 such that the user may visually inspect that the sample material 102 has filled the fluidic channel 120 (e.g., the sample material 102 is present within the fluidic channel 120 between the sample well port 112 and the second capillary stop 128). Specifically, the fill line may include a transparent section of the cartridge body 110 that provides a window into the fluidic channel 120.

Figure 5:
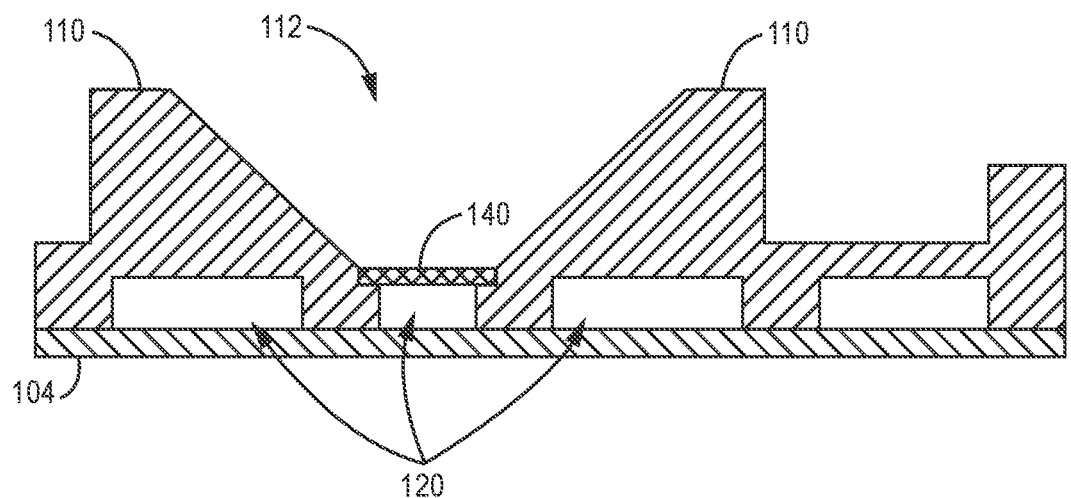
FIG. 5 illustrates another cross-sectional view of the cartridge of FIG. 3, taken across line 5-5'.

The cartridge 100 may also include a filter 140 positioned between the sample well port 112 and the fluidic channel 120 (e.g., as shown in FIG. 5). The filter 140 may be positioned such that the sample material 102 deposited within the sample well port 112 wicks through the filter 140 and into the fluidic channel 120. In other words, the sample well port 112 may be configured such that the filter 140 may be in the bottom of the sample well port 112 and the fluidic channel 120 is located below the filter 140 to uptake the sample material 102.

In one or more embodiments, the filter 140 may provide a coarse filter of the sample material 102 (e.g., filtering out particulates that are greater than or equal to 20 micrometers). For example, the filter 140 may define a pore size of less than or equal to 60 micrometers, less than or equal to 40 micrometers, less than or equal to 20 micrometers, etc. and/or greater than or equal to 0.5 micrometers, greater than or equal to 1 micrometer, greater than or equal to 2 micrometers, etc. Further, the filter 140 may define a bubble point of less than or equal to 4,500 Pa, less than or equal to 4,000 Pa, less than or equal to 3,500 Pa, etc. and/or greater than or equal to 1,000 Pa, greater than or equal to 2,000 Pa, greater than or equal to 3,000 Pa, etc. The bubble point of the filter 140 may be described as the pressure barrier above which gas (e.g., air) may be pushed through the filter 140. Therefore, when a pressure (e.g., pneumatic pressure) is applied within the fluidic channel 120 to move the sample material 102, the pneumatic pressure is contained within the fluidic channel 120 as long as the pneumatic pressure stays below the bubble point of the filter 140 (e.g., below 4,000 Pa).

In one or more embodiments, the fluid drive port 160 may be configured to be operably connected to (e.g., in fluid communication with) a pressure source 14 when the cartridge 100 is inserted into the instrument 12. For example, a pump (e.g., the pressure source 14) of the instrument 12 may be aligned with the fluid drive port 160 when the cartridge is inserted into the instrument 12 such that that the pressure source 14 may apply a pressure within the fluidic channel 120 via the fluid drive port 160. In one or more embodiments, the pressure source 14 used to apply a pressure through the fluid drive port 160 may utilize existing pumps, valves and ports already present in the cartridge 100. In other words, in some embodiments, no additional fluid pumps, valves, or ports that are solely dedicated to the applying a pressure within the fluidic channel 120 of the cartridge 100 may be required.

The pressure source 14 may apply a pressure through the fluid drive port 160 to apply a positive pressure (e.g., pressure applied upstream of the fluid reservoir 150) within the fluidic channel 120. The pressure source 14 may be configured (e.g., through the use of a metering valve) such that the pressure through the fluid drive port 160 may be selectively controlled to take into account, e.g., other characteristics of the cartridge 100. For example, the pressure applied within the fluidic channel 120 may be such that the pressure barriers of each of the first and second capillary stops 134, 128 may be overcome and the pressure applied within the fluidic channel 120 may be below the bubble point of the filter 140 (e.g., the pressure may not be high enough to force gas through the filter 140). Specifically, the pressure applied within the fluidic channel 120 (e.g., via the fluid drive port 160) may be greater than or equal to 500 Pa (e.g., based on the pressure barrier of the capillary stops) and less than or equal to 4,000 Pa (e.g., based on the bubble point of the filter 140).

Therefore, gas from the pressure source 14 may not pass through the wetted filter 140 and, instead, may only apply a pressure on the sample material 102 in a direction towards and into the fluid reservoir 150. Additionally, in one or more embodiments, the sample material 102 may be forced back through the filter 140 and into the sample well port 112, but as described above, gas from the pressure source 14 may not pass through the filter 140. Thereafter, any excess sample material 102 in the sample well port 112 may be allowed to wick into the fluidic channel 120. As such, the filter 140 may effectively act as a seal for gas but not fluid (e.g., because the pore size of the filter 140 allows for the transfer of fluid therethrough).

The pore size of the filter 140 may be selected such that the pore size is large enough to allow sample material 102 to pass therethrough, but small enough for the filter 140 to prevent gas to pass therethrough as it pertains to a pneumatic pressure applied within the fluidic channel 120. Therefore, the pore size of the filter 140, which corresponds to a bubble point of the filter 140, may be selected to balance the desire to allow the sample material 102 to pass through and prevent gas from passing through. Further, the pressure required to overcome the capillary stops of the fluidic channel 120 combined with the bubble point of the filter 140 may create a range of pressures (e.g., between 500 Pa and 4,000 Pa) that may be applied within the fluidic channel 120 to effectively move the sample material 102.

In some embodiments, the instrument 12 may include a negative pressure source 18 located downstream of the fluidic channel 120 and the fluid reservoir 150. In FIG. 2, the negative pressure source 18 is illustrated in broken lines because the negative pressure source 18 may be positioned within the instrument 12 such that the negative pressure source 18 may only be operably connected with the cartridge 100 when the cartridge 100 is inserted into the instrument 12. Further, in some embodiments, the negative pressure source 18 may or may not be included in the system 10. The negative pressure source 18 may apply a vacuum or suction to the fluidic channel 120 to move the sample material 102 into the fluid reservoir 150 (and, e.g., to overcome the second capillary stop 128). In such embodiments that include a negative pressure source 18, the cartridge 100 may include a filter 140 positioned between the sample well port 112 and the fluidic channel 120. However, in some embodiments that include a negative pressure source 18, the cartridge 100 may not include a filter 140 positioned between the sample well port 112 and the fluidic channel 120 (e.g., because fluid or gas is not forced toward the sample well port 112 when using the negative pressure source 18).

Additionally, the cartridge 100 may include a bulk acoustic wave resonator sensor 105 as described herein. The bulk acoustic wave resonator sensor 105 may include a bulk acoustic wave resonator 106 having a sensing surface 107 (e.g., an analyte-binding surface). Additionally, the cartridge 100 may include a fluid flow path 108 extending between the fluid reservoir 150 and the sensing surface 107. The resonator sensor 105 depicted in FIG. 2 includes a plurality of bulk acoustic wave resonators 106 located in a fluid flow path 108 through which an acquired sample material 102 may flow. The sensor 105 may have one or more electronic components to drive the resonators 106 into oscillating motion and measure a change in an oscillation characteristic of the resonator 106 as the sample material 102 is passed over the sensing surface 107 of the resonators 106. In addition or alternatively, one or more electronic components for driving and sensing a response from the resonators 106 may be external to the cartridge 100, such as on an instrument 12 depicted in FIG. 1. The instrument 12 or other suitable external device may be electrically coupled to the sensor 105 in any suitable way (e.g., when the cartridge 100 is inserted into the receptacle 16 of the instrument 12).

Further, the resonators 106 of the sensor 105 may be used for a variety of different suitable purposes. For example, one or more sensors 105 may be used in a control group or to provide redundancy.

In one or more embodiments, the system 10 may include a controller (e.g., located within the instrument 12) configured to control the pressure source 14 that may be present in the system. The methods and/or logic described in this disclosure, including those attributed to the system 10, or various constituent components (e.g., the controller 26), may be implemented, at least in part, in hardware, software, firmware, or any combination thereof. For example, various aspects of the techniques may be implemented within one or more processors, including one or more microprocessors, microcontrollers, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry. Such hardware, software, and/or firmware may be implemented within the same system or within separate systems to support the various operations and functions described in this disclosure. In addition, any of the described components may be implemented together or separately as discrete but interoperable logic devices.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

When the cartridge 100 is operably coupled to external equipment of the system 10 (e.g., within the instrument 12), the sensor 105 may be electrically coupled to the controller. The sensor 105, external device, and controller include one or more electronic components to drive the resonators 106 into oscillating motion and measure a change in an oscillation characteristic of the resonator 106 as the sample material 102 is passed over the sensing surface 107 of the resonators 106.

Figure 3:
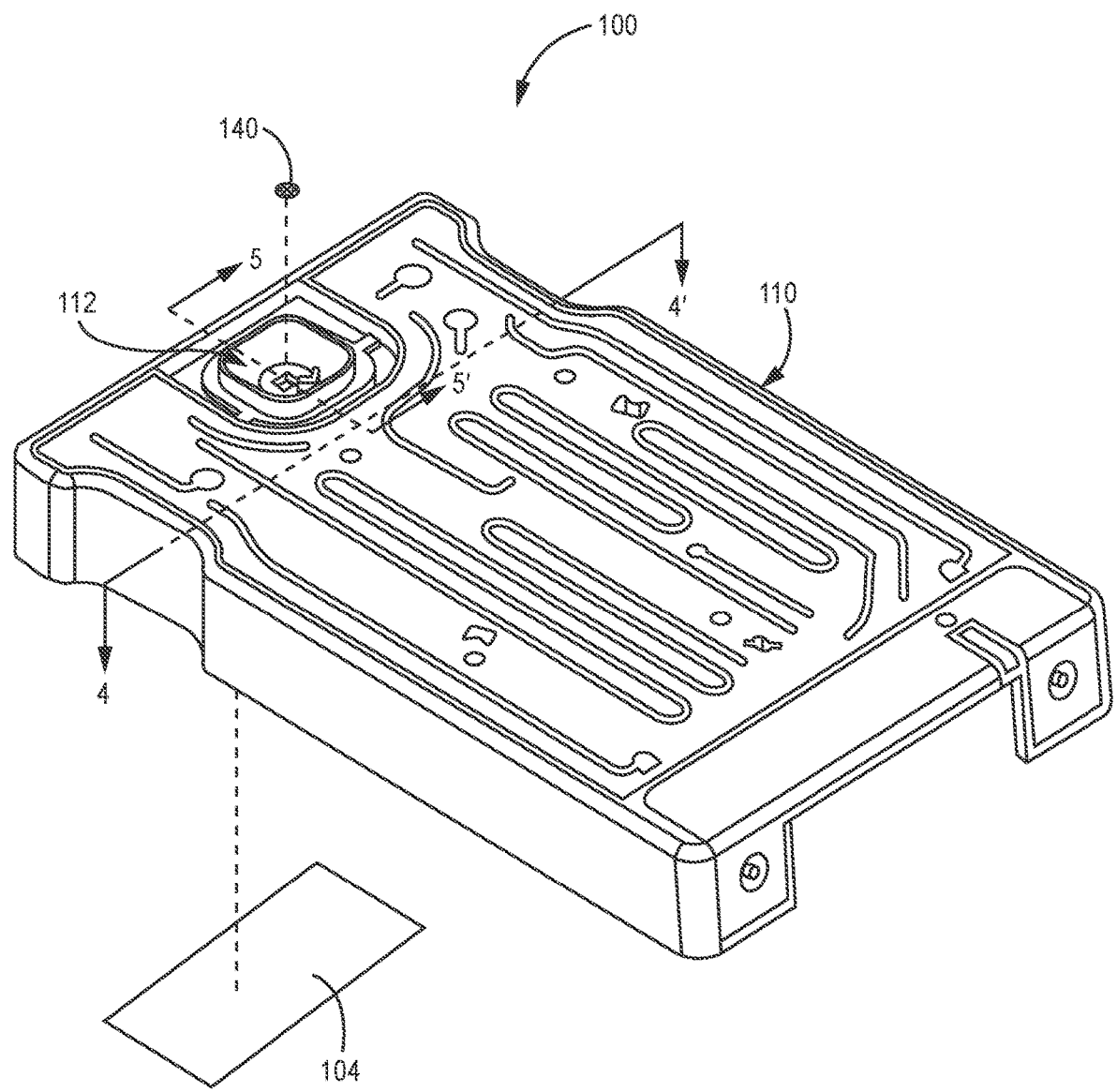
FIG. 3 illustrates a perspective view of an embodiment of a cartridge in accordance with embodiments of the present disclosure.
Figure 4:
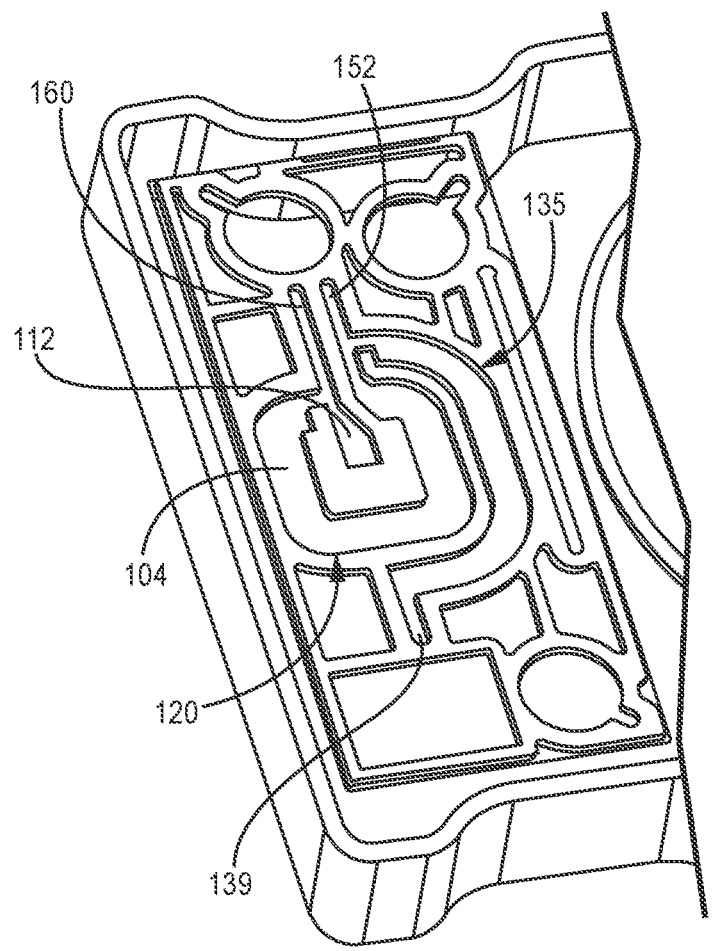
FIG. 4 illustrates a cross-sectional view of the cartridge of FIG. 3, taken across line 4-4', depicting an illustrative fluidic channel.

A specific embodiment of an illustrative cartridge 100 is depicted in FIGS. 3-5. The cartridge 100 may include any of the components or features described above with regards to the cartridge 100 illustrated in FIGS. 1 and 2. As shown in FIG. 3, the cartridge 100 includes a cartridge body 110 defining a sample well port 112. Further, the cartridge 100 may include a filter 140 positioned within the sample well port 112, for example, between the sample well port 112 and the fluidic channel 120 (e.g., as illustrated in FIGS. 4 and 5).

Additionally, as will be described further herein, the cartridge 100 may include a fluidic channel membrane 104 that may be, e.g., attached to the bottom of the cartridge body 110 to form at least one surface of the fluidic channel 120 (e.g., as shown in FIGS. 4 and 5). For example, the fluidic channel membrane 104 may be formed of an adhesive or tape. Further, the fluidic channel membrane 104 may be made from or coated with hydrophilic materials to optimize or control the ability for fluids to flow through the fluidic channel 120. Specifically, the fluidic channel membrane 104 may be a polyethylene terephthalate (PET) substrate with a hydrophilic pressure sensitive adhesive.

A detailed view of the passages defined by the fluidic channel 120 of the cartridge 100 is illustrated in FIG. 4 (e.g., a cross-sectional view of the cartridge 100 of FIG. 3 taken across line 4-4'). As shown, the fluidic channel 120 extends between the sample well port 112 and a reservoir port 152 that is in fluid communication with the fluid reservoir (e.g., similar to the fluid reservoir 150 illustrated in FIG. 2). The fluidic channel 120 may extend between the sample well port 112 and the reservoir port 152 in any suitable way. For example, as shown in FIG. 4, the fluidic channel 120 extends along a circular path around the sample well port 112.

A fluid drive port 160 may be positioned upstream (e.g., relative to the direction of pressure applied within the fluidic channel 120) of the reservoir port 152 and may be configured to be operably coupled to a pressure source (e.g., when the cartridge 100 is inserted into the instrument 12) to apply pressure within the fluidic channel 120 and move the sample material towards the reservoir port 152. As shown in FIG. 4, gas pressure applied through the fluid drive port 160 may travel towards the sample well port 112 or the fluidic channel 120. Due to the presence of the filter 140 (e.g., illustrated in FIG. 5) as described herein, gas from the fluid drive port 160 may not pass through the filter 140 (e.g., because of the bubble point of the filter 140) and, instead, may apply pressure within the fluidic channel 120 (e.g. applying a pressure on the sample material). Further, as described herein, any sample material present in the passage between the fluid drive port 160 and the sample well port 112 may be forced back through the filter 140 (therefore, this portion of sample material may be small and not delivered to the fluid reservoir).

Further, the cartridge 100 may define an overflow fluidic channel 135 (e.g., an overflow reservoir) in fluid communication with the fluidic channel 120 such that any excess sample material within the fluidic channel 120 may be disposed of in the overflow fluidic channel 135. Further, the overflow fluidic channel 135 may define a volume of about 40 uL. In one or more embodiments, the overflow fluidic channel 135 may include an overflow port 139 configured to help vent the overflow fluidic channel 135. In one or more embodiments, the overflow port 139 may be blocked or prevented from allowing air or fluid to pass through, e.g., when the cartridge 100 is positioned within the instrument 12. In such embodiments, the overflow port 139 may be restricted so that when a pressure is applied to the fluidic channel 120, the sample material 102 may travel into the fluid reservoir 150 and may not be forced through the overflow port 139. Further, any sample material 102 located within the overflow fluidic channel 135 may remain in the overflow fluidic channel 135 (e.g., because it may be prevented from exiting through the overflow port 139 and may not be pulled into the fluid reservoir 150).

As shown in FIG. 4, the fluidic channel membrane 104 may define a bottom surface of the fluidic channel 120. The fluidic channel membrane 104 may form a continuous surface along the bottom of the sample well port 112, the fluidic channel 120, and the overflow fluidic channel 135.

Additionally, the fluidic channel membrane 104 is illustrated in FIG. 5 (e.g., a cross-sectional view of the cartridge 100 of FIG. 3 taken across line 5-5'). For example, the fluidic channel membrane 104 may be attached to a bottom of the cartridge body 110 to form a bottom surface of the fluidic channel 120. The fluidic channel 120 and/or the overflow fluidic channel 135 may define any suitable channel depth and channel width. For example, the channel depth (of the fluidic channel 120 and/or the overflow fluidic channel 135) may be greater than or equal to 0.5 mm, greater than or equal to 1 mm, greater than or equal to 1.5 mm, etc. and/or less than or equal to 3 mm, less than or equal to 2.5 mm, less than or equal to 2 mm, etc. Further, for example, the channel width (of the fluidic channel 120 and/or the overflow fluidic channel 135) may be greater than or equal to 0.5 mm, greater than or equal to 1 mm, greater than or equal to 1.5 mm, etc. and/or less than or equal to 3 mm, less than or equal to 2.5 mm, less than or equal to 2 mm, etc. Also, as shown in FIG. 5, the filter 140 may be located between the sample well port 112 and the fluidic channel 120. Further, it is noted that the fluidic channel 120 and/or the overflow fluidic channel 135 may define a rectangular cross-sectional shape or a non-rectangular cross-sectional shape (e.g., a tapered shape, a triangular shape, a rounded shape, etc.).

Figure 6:
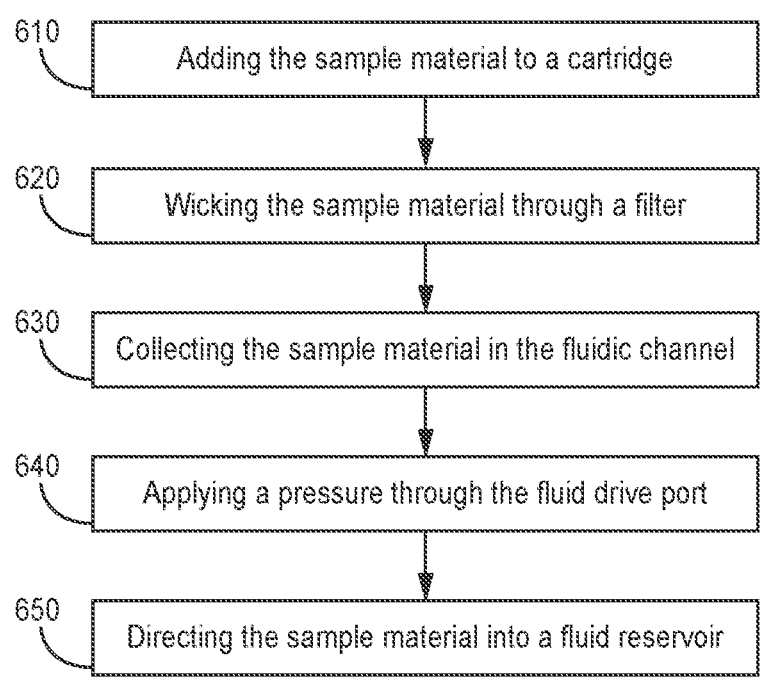
FIG. 6 illustrates a method of collecting a sample material using the cartridge of FIGS. 2-3.

An example of an illustrative method 600 of collecting a sample material is illustrated in FIG. 6. For example, the method 600 may include adding 610 the sample material to a cartridge through a sample well port defined by a cartridge body of the cartridge. As described above, the sample well port may be configured such that a cap does not cover, attach, or seal the sample well port. The method 600 may also include wicking 620 the sample material through a filter positioned between the sample well port and a fluidic channel defined by the cartridge body.

Further, the method 600 may include collecting 630 the sample material in the fluidic channel and applying 640 a pressure through a fluid drive port of the cartridge in fluid communication with the fluidic channel. In one or more embodiments, collecting the sample material in the fluidic channel may include wicking the sample material into the fluidic channel via capillary action. Finally, the method 600 may include directing 650 the sample material into a fluid reservoir by applying 640 the pressure through the fluid drive port. It is noted that, as described above, the cartridge may not include a cap covering, attached to, or sealing the sample well port when the pressure is applied through the fluid drive port or when the sample material is directed into the fluid reservoir. As such, the sample well port may be described as a capless sample well port.

In one or more embodiments, applying a pressure through a fluid drive port of the cartridge in fluid communication with the fluidic channel may include applying a positive pressure through the fluid drive port via a pressure source or pump operably connected to the fluid drive port. For example, the cartridge may be inserted into an instrument to operably couple the fluid drive port to the pressure source or pump. In one or more embodiments, when the cartridge is inserted into the instrument, the overflow port may be closed so that when a pressure is applied through the fluid drive port, the sample material only moves into the fluid reservoir and any sample material within the overflow fluidic channel portion remains in the overflow fluidic channel portion. Further, the pressure source or pump may be located upstream of the fluid reservoir and the fluidic channel to apply a "positive" pressure upon the fluidic channel. In one or more embodiments, the method may further include containing the sample material within the fluidic channel due to a capillary stop of the fluidic channel (e.g., proximate the fluid reservoir and/or the fluid drive port). Further, directing the sample material into a fluid reservoir by applying the pressure through the fluid drive port may include overcoming the capillary stop of the fluidic channel.

Illustrative embodiments are described and reference has been made to possible variations of the same. These and other variations, combinations, and modifications will be apparent to those skilled in the art, and it should be understood that the claims are not limited to the illustrative embodiments set forth herein.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Any direction referred to herein, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

What is claimed is:

1. A cartridge comprising:
   a cartridge body defining a capless sample well port configured to receive a sample material and a fluidic channel in fluid communication with the capless sample well port;
   a filter positioned between the capless sample well port and the fluidic channel, wherein the filter defines a bubble point of less than or equal to 4,000 Pa;
   a fluid reservoir, wherein the fluidic channel extends between the capless sample well port and the fluid reservoir; and
   a fluid drive port in fluid communication with the fluidic channel, wherein the fluid drive port is configured to be operably connected to a pressure source such that a pressure is applied within the fluidic channel to direct the sample material towards the fluid reservoir.

2. The cartridge of claim 1, wherein the fluidic channel is configured to provide a capillary action on the sample material passing through the fluidic channel.

3. The cartridge of claim 1, wherein the capless sample well port is located between the fluid drive port and the fluid reservoir.

4. The cartridge of claim 1, wherein the fluidic channel further comprises an overflow fluidic channel portion, wherein the overflow fluidic channel portion is located upstream of a reservoir port of the fluid reservoir.

5. The cartridge of claim 1, wherein the fluid drive port is configured to be operably connected to a pump.

6. The cartridge of claim 1, wherein the fluidic channel comprises a capillary stop proximate the fluid reservoir, wherein the capillary stop is configured to allow the sample material to pass therethrough at a pressure greater than or equal to 500 Pa.

7. The cartridge of claim 1, wherein the pressure is applied upstream of the fluid reservoir.

8. The cartridge of claim 1, further comprising:
   a sensor comprising a bulk acoustic resonator having a sensing surface; and
   a fluid flow path extending between the fluid reservoir and the sensing surface.

9. A system comprising:
   an instrument for testing a sample material and defining a receptacle, wherein the instrument comprises the pressure source; and
   the cartridge of claim 1, wherein the cartridge is configured to be inserted into the receptacle of the instrument.

10. The system of claim 9, wherein the pressure source of the instrument is configured to be in fluid communication with the fluid drive port of the cartridge when the cartridge is inserted into the instrument.

11. A method of collecting a sample material, the method comprising:
    adding the sample material to a cartridge through a capless sample well port defined by a cartridge body of the cartridge;
    wicking the sample material through a filter positioned between the capless sample well port and a fluidic channel defined by the cartridge body, wherein the filter defines a bubble point of less than or equal to 4,000 Pa;
    collecting the sample material in the fluidic channel;
    applying a pressure through a fluid drive port of the cartridge in fluid communication with the fluidic channel; and
    directing the sample material into a fluid reservoir by applying the pressure through the fluid drive port.

12. The method of claim 11, wherein the pressure applied through the fluid drive port is greater than or equal to 500 Pa and less than or equal to 4,000 Pa.

13. The method of claim 11, wherein applying a pressure through a fluid drive port of the cartridge in fluid communication with the fluidic channel comprises applying a positive pressure through the fluid drive port via a pump operably connected to the fluid drive port.

14. The method of claim 11, further comprising containing the sample material within the fluidic channel due to a capillary stop of the fluidic channel proximate the fluid reservoir.

15. The method of claim 14, wherein directing the sample material into a fluid reservoir by applying the pressure through the fluid drive port comprises overcoming the capillary stop of the fluidic channel.

16. The method of claim 11, further comprising inserting the cartridge into an instrument to operably couple the fluid drive port to a pressure source.

17. The method of claim 11, wherein collecting the sample material in the fluidic channel comprises wicking the sample material into the fluidic channel via capillary action.

18. The method of claim 11, wherein applying a pressure through a fluid drive port of the cartridge in fluid communication with the fluidic channel comprising applying a positive pressure upstream of the fluid reservoir.

\* \* \* \* \*